Aug. 22, 1950   F. K. KRAG   2,519,669
SCRAP CUTTER AND THE LIKE
Filed April 19, 1947   2 Sheets-Sheet 1

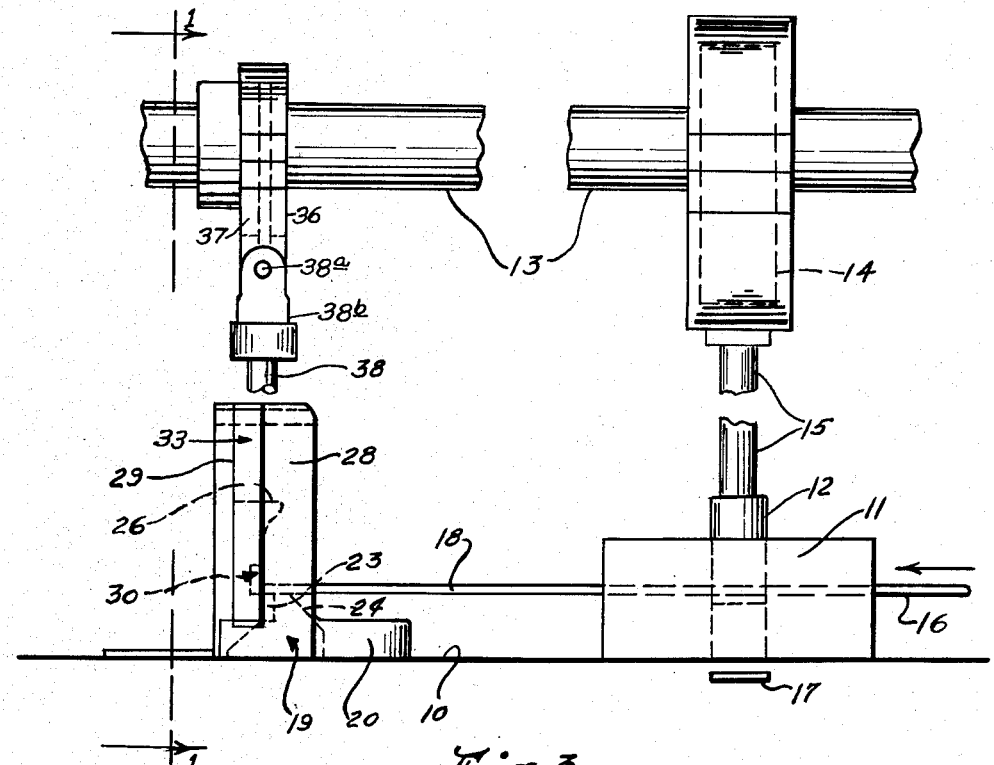
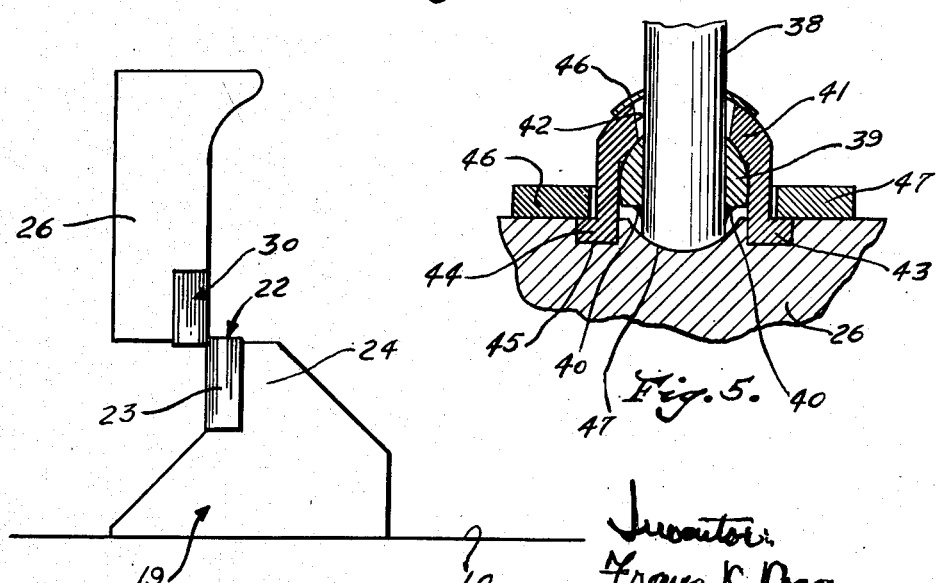

Patented Aug. 22, 1950

2,519,669

UNITED STATES PATENT OFFICE 2,519,669

SCRAP CUTTER AND THE LIKE

Franz K. Krag, Chicago, Ill.

Application April 19, 1947, Serial No. 742,686

6 Claims. (Cl. 164—10.6)

This invention relates to improvements in scrap cutters and the like. These scrap cutters are intended for use in connection with punch presses and similar machine tools, and are for the purpose of cutting the bar scrap into shortened lengths during the progress of the die cutting operations. Generally such cutting into shortened lengths will proceed regularly during the successive advancing movements of the bar stock which is being fed through the punch press, but at times it may be desired to discontinue the scrap cutting operations, allowing the scrap bar to leave the press in a continuous length. At such times the scrap cutter should be so disconnected from the punch press mechanisms that it will remain idle; but when thus idle the jaws or blades of the scrap cutter should be retained in open position so that the advancing bar stock scrap may move regularly between such blades.

One object of the present invention is to provide a very simple but effective form of scrap cutter which may be readily attached and secured to the table of a punch press; said scrap cutter being substantially self-contained in its construction, but being provided with suitable means whereby its movable blade or jaw may be operatively connected to the drive shaft of the punch press to cause proper rotation of the scrap cutter.

Another object of the invention is to provide a very simple means to connect the reciprocating rod or link by which the movable blade is reciprocated, to said blade. This connecting means is so constructed that it may be readily disconnected from the movable blade when said blade is to remain idle, to thereby allow the cutter to remain idle while the punch press continues to operate. This disconnectable connection includes a bayonet connector of such form that by a simple quarter turn of a suitable part the lower end of the reciprocating rod may be connected to or disconnected from the fixture carried by the blade, thus making possible the connecting or disconnecting operations merely by such quarter turn operation.

The fixture just above referred to also includes a ball and socket joint of such form that the required swinging movements between the reciprocating rod and the blade may be readily accommodated. When the reciprocating rod has been disconnected from the blade said rod may be swung to one side and lashed away from the scrap cutter elements, but in such a manner as to allow for the continued reciprocating movements of said rod during the continued punch press operations.

Spring means is provided to normally move the blade to its uppermost position as limited by a suitable bracket. When the reciprocating rod has been disconnected from the blade this spring means serves to move and retain the blade in its raised position and out of the way of bar stock advancing from the press dies. By this means said blade is held in raised position during such times. However, when the reciprocating rod is to be again connected to the blade to restore the scrap-cutting function said blade must be rocked down against the force of such spring during the attaching operation. For this purpose I have provided a simple form of rock finger by which a sufficient amount of pressing force may be readily exerted on the blade to force it down against the said spring; and then after the reciprocating rod has been attached to the blade said finger may be restored to its non-engaging position, to allow normal functioning of the blade to be restored.

A further feature of the present invention consists in the provision of means whereby the base element of the scrap cutter may be bodily adjusted laterally on the table of the punch press, together with means whereby the proper operating connection between the eccentric on the punch press shaft and the movable cutting blade of the scrap cutter will be maintained throughout all normal lateral adjustments of the base element of the scrap cutter on the punch press table. It is here noted that such lateral adjustments of the base element of the scrap cutter on the punch press table are desirable in order to bring the scrap cutter into such position that the bar scrap will be severed at selected positions with respect to the holes in said bar scrap, which holes have been previously formed by the punching operations. By means of the lateral adjustments herein provided it is possible to bring the scrap cutter always to that position on the punch press table where the cutting operations on the bar scrap will be produced at the selected positions with respect to the holes punched in the bar scrap.

The operating connections of the punch press shaft to the movable blade of the scrap cutter include a vertically reciprocable link between these parts. It is a feature of the present invention that I have provided universal joints between the ends of this link and the eccentric strap which encircles the eccentric, and the movable blade of the scrap cutter. These universal joints permit of such lateral adjustments of the base element on the punch press table without corresponding lateral adjustments of the eccentric being required, and still the proper reciprocating movements of the movable blade of the scrap cutter are produced during the punch press operations, and during the punch press shaft rotations.

The vertical operating link which connects the eccentric strap with the movable blade of the scrap cutter will cause the same amount of up and down swing of that cutting blade for shaft rotations irrespective of the exact lateral position of the base element with respect to the punch press dies, but it is evident that when the base element of the scrap cutter is moved to one side or the other with respect to a position directly beneath the eccentric on the punch press shaft the movable blade will be raised slightly, so that it will reciprocate within a range of movements somewhat higher than when directly beneath the eccentric. I prefer to provide the blades of the scrap cutter with an amount of overlap during their cutting operations so that they will always properly co-operate for the scrap cutting operation even when the base element of the scrap cutter is shifted laterally from a position directly beneath the eccentric. I have also made provision for changing the length of the link so that when such lateral adjustment is made the blade will nevertheless reciprocate through the same range of movements, and between the same upper and lower limits of movement, as will be the case when the scrap cutter occupies a position directly beneath the eccentric.

Other objects and uses of the invention will appear from a detailed description of the same which consists in the features of construction and combinations of parts hereinafter described and claimed.

In the drawings:

Figure 1 shows a face elevation of a typical scrap cutter embodying the features of the present invention, and as attached to a typical form of punch press, which punch press is shown more or less schematically, the central portion of the reciprocating rod being cut away to shorten the figure vertically, the movable blade of the scrap cutter being shown in its lowered or cutting position, the finger being swung into its non-interfering position, and a portion of the movable blade being cut away to better show the ball and socket joint connection and related parts;

Figure 3 shows an elevational view corresponding to Figure 1, but at right angles thereto;

Figure 1:
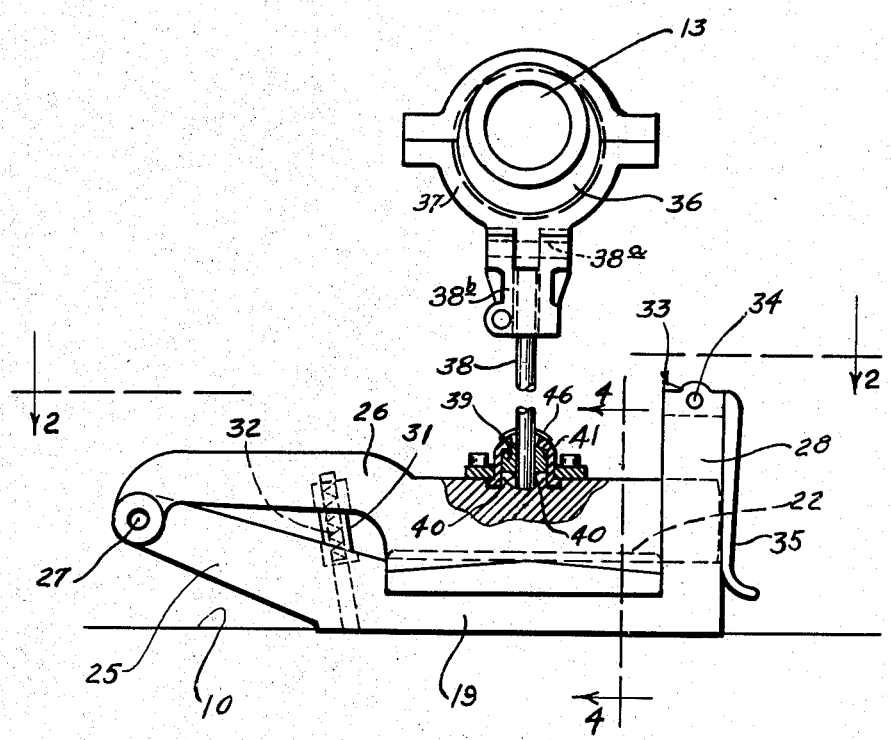

Figure 4 shows a cross-section through the stationary and movable blades, taken on the line 4—4 of Figure 1 looking in the direction of the arrows, but on enlarged scale, the blades being in co-operating position, that is, the movable blade is in lowered position; and Figure 5 shows a fragmentary section through the ball and socket joint connection between the lower portion of the reciprocating rod and the movable blade, on enlarged scale as compared to Figure 1.

In the several figures the table which carries the stationary die and to which the scrap cutter of the present invention is to be connected is shown at 10. The stationary die is shown at 11, and may of course be of any suitable form. The details thereof are therefore not herein illustrated. The companion or male die is shown at 12. The usual rotating shaft of the punch press is shown at 13. It is schematically shown as being provided with the eccentric 14 which is connected to the male die 12 by the press link 15 in well understood manner. A bar of stock 16 is shown as being fed through the female die 11 in the direction of the arrow in Figure 3. Typically, a punched out section from said bar is shown at 17, having been cut out from the bar and fallen to the position shown in Figure 3. Suitable advancing means, not shown, is provided in connection with the die elements and the punch press to ensure intermittent advancement of the bar stock during the intervals between downward movements of the male die, in well understood and conventional manner. Thus the bar scrap, 18, advances from the companion dies towards the left intermittently.

The scrap cutter of the present invention includes a base element 19 having a suitable configuration for setting on the table 10. For this purpose said base element 19 is also shown as provided with the laterally extending feet 20 provided with the elongated slots 21 whereby said base element may be connected to the table by use of suitable screws, not shown. The slots 21 permit the base element 19 and the entire body of the scrap cutter to be adjusted laterally on the punch press table 10 and secured in any laterally adjusted position within the limits of adjustment permitted by the slots 21. This base element carries the stationary blade 22, preferably comprising a hardened block 23 set into a recess of the flange 24 of the base element. Furthermore, this stationary blade is preferably provided with the straight edge as well shown in Figure 1.

At one end, preferably its rear end, this base element 19 is provided with the extension 25 which extends upwardly at an easy angle. The movable blade carrier 26 is pivotally connected to this extension by the cross pin 27 so that said blade carrier is permitted to reciprocate vertically through an angle sufficient to enable the desired functions to be effected. The opposite end of the base element, preferably its front end, is provided with the slotted vertical extension 28, having the slot 29 wherein the front end of the blade carrier is permitted to swing up and down, and by which slot said front end of the blade carrier is guided and kept in a straight up and down path of movement, and whereby lateral pressures exerted on the blade carrier during scrap cutting operations are resisted. The cutting blade proper preferably comprises a hardened block 30 set into a recess along the lower edge of the movable blade carrier. Examination of Figure 1 shows that the cutting edge of this movable blade is preferably formed so that it shears with the stationary blade 23 with a progressive shearing action. To this end this movable blade is conveniently formed with a slightly V-shaped form, as well shown in Figure 1. During the downward or shearing movement the movable blade shears along the cutting edge of the stationary blade; and any lateral force exerted on the movable blade carrier during this shearing action is resisted by the guiding of the movable blade in the vertical slot 29.

A spring housing 31 is provided between the base element 19 and the movable blade carrier 26. This spring housing is conveniently of telescoping form; and a spring 32 is enclosed in this housing. This spring acts between the base element and the blade carrier and tends to raise the movable blade carrier against the depressing force of the reciprocating rod presently to be described. Therefore the spring tends at all times to raise the blade carrier. The construction is however such as to permit downward movement of the blade carrier sufficient to ensure complete shearing action to be effected.

Pivotally mounted to the upper portion of the front extension 28 of the base element, and within the slot 29 thereof is the finger piece 33. This pivotal connection is effected by the cross pin 34. A tail or handle 35 is provided on this finger piece whereby it can be rocked through substantially 90 degrees from the position shown in Figure 1. When this finger piece is in the position shown in Figure 1 the full upward movement of the movable blade carrier is permitted, whereas by rocking the finger piece through substantially ninety degrees counterclockwise from the position of Figure 1, thus bringing the handle into a horizontal position, and the finger proper into a vertical position, said finger proper will force the movable blade down its complete movement, unless said blade has already been forced down, in which latter case said blade will be temporarily locked in such downward position by the finger piece. The desirability of this arrangement will presently appear in full detail.

Figure 2:
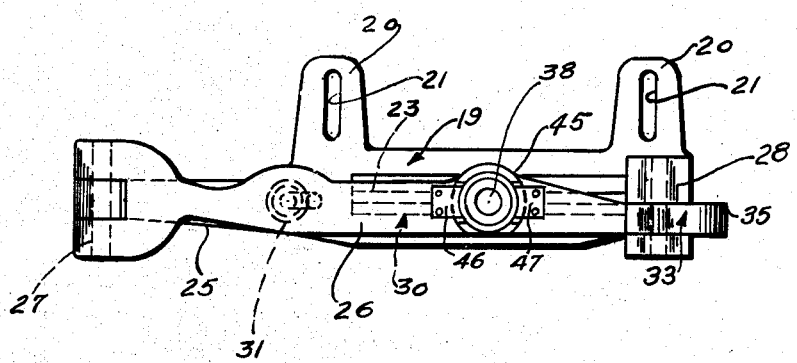
Figure 2 shows a plan view taken substantially on the line 2—2 of Figure 1, looking in the direction of the arrows.

The shaft 13 carries the eccentric 36. The eccentric band 37 of this eccentric has connected thereto the push rod or bar 38 which extends down to the position of the blade carrier 26. The connection of the upper end of the push rod 38 to the eccentric band includes the universal joint 38ª such that the rod 38 can be swung laterally of the punch press and still maintain operative connection to the eccentric band. This connection also includes the split socket connection 38ᵇ such that the amount of insertion of the upper end of the rod 38 into said socket may be adjusted to thereby in effect change the length of the rod or link 38. The lower end of this push rod has secured to it the ball element 39. Such securing is conveniently effected by the welding shown at 40 in Figures 1 and 5. Thus this rod 38 serves to ensure both up and down movements of the ball element. The socket element 41 which is a companion to the ball element, is provided with the central opening 42 of sufficient size to allow for some lateral swinging movement of the push rod 38 without interference therewith, to thus accommodate lateral swings of the push rod and of the movable blade carrier in normal functioning. The lower edge of this socket element is provided with the opposed outwardly extending flanges 43 and 44 which are set down into a circular recess 45 of the upper face of the blade carrier so that the socket element may be turned about a substantially vertical axis through substantially 90 degrees of rocking movement. The lug elements 46 and 47 are secured to the top face of the blade carrier at opposite locations thereon, and these lug elements then overlie the flange portions of the socket element 41 so as to retain the same against upward movement away from the blade carrier. However, by turning the socket element through substantially 90 degrees from the position as shown in Figure 2 the flanges 43 and 44 of the socket element will be disengaged from the lugs and thereupon the socket element, together with the ball element and the push rod may be raised away from the blade carrier; or conversely, with the push rod in its raised position the blade carrier may then be rocked down against the force of the spring 32 far enough to allow the push rod and the ball element connected thereto to be swung to one side and away from the blade carrier from which these parts have thus been disconnected. Conversely, when the push rod is to be again connected to the blade carrier such connection may be readily effected by a reversal of the operations just stated.

During the disconnecting operation just explained the blade carrier occupies its lowered position. In such position said blade carrier co-operates with the stationary blade and its carrier in such a manner that free endwise movement of the bar stock or scrap is prevented. It is therefore desirable that after the push rod has been disconnected from the movable blade carrier said blade carrier be allowed to rise to a non-interfering position. This result may be effected by merely rocking the finger piece 33 into the position shown in Figure 1 wherein the blade carrier is allowed to rise under the force of the spring 32 and into a non-interfering position high enough to allow the bar scrap to pass between the two blades in case it should be desired to continue punching operations without cutting the bar scrap into short lengths.

When the push rod has been disconnected as explained above it may be loosely lashed to one side, out of the way from other parts; and then the normal punching operations may proceed without cutting off the bar scrap, the push rod merely moving under the influence of the eccentric 36, but without interference with the raised blade carrier.

If desired a spherical shield 46 may be set over the opening 42 of the socket element 41 to prevent foreign matter from getting into said opening 42. Such shield will in such case rock back and forth over the outer face of the socket element according to the swinging movements of the push rod.

It should be mentioned that the blade carrier is preferably provided with a spherical recess 47 to accommodate the spherically formed lower end of the push rod, so that satisfactory pushing action will be communicated from the push rod to the blade carrier at all positions of said blade carrier in normal service.

The lateral adjustability of the base element of the scrap cutter unit makes it possible to bring said unit always to such position with respect to the intermittently advancing bar scrap that the scrap cutting operations will occur at selected positions with respect to the successive punched openings of the bar scrap, as, for example, positions where the material of the bar scrap is narrow and readily severed. The universal joint connections of the upper and lower ends of the bar or link with the eccentric band and the movable blade of the scrap cutter ensure proper operations to be transmitted from the eccentric to the movable blade irrespective of lateral adjustments of the scrap cutter on the table of the punch press, within the limits of adjustment permitted by the slots 21. The split socket connection 38ᵇ permits the length of the link 38 to be adjusted to ensure rocking movements of the movable blade between selected upper and lower limits even when the scrap cutter is adjusted to one side or the other of its position directly beneath the eccentric.

While I have herein shown and described only a single embodiment of my present invention, still I do not intend to limit myself thereto, except as I may do so in the claims to follow.

Where, in the specification and claims to follow, I use the expression "eccentric means" or like expressions it is to be understood that I contemplate any suitable form of means in connection with the rotating means to produce a reciprocating movement of the "push bar" or like element, as for example, a crank pin in connection with the rotating means or shaft.

I claim:

1. In a scrap cutting device for periodically cutting off scrap bar as it moves from a punch press between punching operations thereof, said press having male and female dies for the punching operations, and also having means to co-operatively actuate said dies for the punching operations, including a rotating element, said scrap cutting device having in combination a base element, means to support the same in fixed position with respect to the die elements, a horizontal cutting blade carried by said base element, a swinging blade element, pivotal means connecting said swinging blade element with respect to the base element, eccentric means in connection with said rotating element of the punch press, a push bar connected to said eccentric means, there being a socket in the swinging blade element to receive the lower end of the push bar, a ball element secured to the lower end of the push bar, a ball socket to engage the upper portion of the ball element, there being an opening in said socket to freely pass the push bar, lugs in connection with the lower portion of the ball socket, a circular recess in the swinging blade element to receive the said lugs, engaging means carried by the swinging blade element in position to engage with the lugs of the lower portion of the ball socket element when the socket element is in one rotated position, and to permit said lugs to pass between the engaging means of the blade element when the socket element is in another rotated position, spring means tending to raise the swinging blade element with respect to the base element, together with means to lock the swinging blade element in lowered position against the force of said spring means, substantially as described.

2. In a scrap cutting device for periodically cutting off scrap bar as it moves from a punch press between punching operations thereof, said press having male and female dies for the punching operations, and also having means to co-operatively actuate said dies for the punching operations, including a rotating element, said scrap cutting device having in combination a base element, means to support the same in fixed position with respect to the die elements, a horizontal cutting blade carried by said base element, a swinging blade element, pivotal means connecting said swinging blade element with respect to the base element, eccentric means in connection with said rotating element of the punch press, a push bar connected to said eccentric means, a ball and socket bayonet connection between the lower end of the push bar and the swinging blade element, said bayonet connection including lugs on one part engageable with co-operating lugs on the other part, and there being disengagement openings between said last named lugs permitting disengagement of said parts from each other when the bayonet connection is turned into one position, spring means between the base element and the swinging blade element tending to raise said swinging blade element, together with manual means to lock the swinging blade element in lowered position with respect to the base element and against the force of said spring element, substantially as described.

3. In a scrap cutting device for periodically cutting off scrap bar as it moves from a punch press between punching operations thereof, said press having male and female dies for the punching operations, and also having means to co-operatively actuate said dies for the punching operations, including a rotating element, said scrap cutting device having in combination a base element, means to support the same in fixed position with respect to the die elements, a horizontal cutting blade carried by said base element, a swinging blade element, pivotal means connecting said swinging blade element with respect to the base element, eccentric means in connection with said rotating element of the punch press, a push bar connected to said eccentric means, disconnectable means to connect the lower portion of the push bar to the swinging blade element, spring means tending to raise the swinging blade element, and manual means to lock the swinging blade element in lowered position against the force of the spring, and irrespective of downward pressure exerted by the push bar, substantially as described.

4. A device as specified in claim 3 wherein the connection of the push bar to the eccentric means includes a universal joint permitting lateral swing of the push bar with respect to the rotating element of the punch press, substantially as described.

5. A device as specified in claim 3 wherein the means to support the base element in fixed position with respect to the die elements includes means permitting adjustment of the base element laterally with respect to the die elements, to thereby permit adjustment of the distance between the base element and the die elements, substantially as described.

6. A device as specified in claim 3 wherein the means to support the base element in fixed position with respect to the base element includes means permitting adjustment of the base element laterally with respect to the die elements, to thereby permit adjustment of the distance between the base element and the die elements, and wherein the connection of the push bar to the eccentric means includes a universal joint permitting lateral swing of the push bar with respect to the rotating element of the punch press, substantially as described.

FRANZ K. KRAG.

REFERENCES CITED

The following references are of record in the file of this patent:

UNITED STATES PATENTS

| Number | Name | Date |
|---|---|---|
| 1,421,354 | Littell | June 27, 1922 |